(12) United States Patent
Battmer et al.

(10) Patent No.: US 12,105,645 B2
(45) Date of Patent: Oct. 1, 2024

(54) METHOD FOR DISTRIBUTING A NETWORK STREAM

(71) Applicant: Balluff GmbH, Neuhausen a.d.F. (DE)

(72) Inventors: Stefan Battmer, Stuttgart (DE); Frank Hoschle, Oppenweiler (DE)

(73) Assignee: BALLUFF GMBH, Neuhausen ADF (DE)

( * ) Notice: Subject to any disclaimer, the term of this patent is extended or adjusted under 35 U.S.C. 154(b) by 104 days.

(21) Appl. No.: 17/738,691

(22) Filed: May 6, 2022

(65) Prior Publication Data
US 2022/0358056 A1 Nov. 10, 2022

(30) Foreign Application Priority Data
May 10, 2021 (DE) ...................... 10 2021 112 166.3

(51) Int. Cl.
*G06F 13/12* (2006.01)
*G06F 16/22* (2019.01)
*H04L 69/164* (2022.01)

(52) U.S. Cl.
CPC .......... *G06F 13/12* (2013.01); *G06F 16/2255* (2019.01)

(58) Field of Classification Search
CPC .................................. H04L 47/35; H04N 5/77
See application file for complete search history.

(56) References Cited

U.S. PATENT DOCUMENTS

| | | | |
|---|---|---|---|
| 9,712,460 B1 * | 7/2017 | Friend | H04L 47/35 |
| 10,200,733 B1 * | 2/2019 | Adusumilli | H04N 21/42204 |
| 2010/0124271 A1 * | 5/2010 | Martz | H04N 5/77 |
| | | | 375/E7.076 |

(Continued)

OTHER PUBLICATIONS

Microsoft, "Receive-Side Scalig Enhancements in Windows Server 2008", Nov. 5, 2008, Publisher: Microsoft.

*Primary Examiner* — Getente A Yimer
(74) *Attorney, Agent, or Firm* — GableGotwals

(57) ABSTRACT

The invention relates to a method for distributing a network stream from at least one data source to a plurality of processors or processor cores of a computing device. The computing device has a network card which supports the receive side scaling (RSS) function, wherein, when this function is activated, the network card or its device driver generates an RSS indirection table (25) in which there is stored, for each index, the number of a processor or processor core, which will process an incoming data packet assigned to this index, and subsequently the network card calculates a hash value for each incoming data packet and maps the hash value to an index in precisely this table, wherein the hash value is formed via the combination of source and destination IP addresses and ports and is thus static for the duration of the connection. The method comprises the steps of specifying (34) at least one processor or processor core of the computing device, selecting (35) a port of the at least one data source, generating (36) a data set assigned to the selected port, determining (37) the processor or processor core assigned to the data set, repeating the steps of selection (35), generation (36) and determination (37) until a port has been determined for each specified processor or processor core, and sending (39) data packets via the ports determined for the specified processors or processor cores.

11 Claims, 6 Drawing Sheets

(56) References Cited

U.S. PATENT DOCUMENTS

| | | | |
|---|---|---|---|
| 2014/0169382 A1* | 6/2014 | Melman | H04L 45/08 |
| | | | 370/401 |
| 2017/0105116 A1* | 4/2017 | Kompella | H04L 41/0803 |
| 2017/0337631 A1* | 11/2017 | Fuzaylova | G06Q 40/06 |
| 2018/0152377 A1* | 5/2018 | Wetterwald | H04W 40/04 |
| 2018/0248806 A1* | 8/2018 | Burnley | H04L 1/0002 |
| 2021/0329306 A1* | 10/2021 | Liu | G06V 40/168 |

* cited by examiner

METHOD FOR DISTRIBUTING A NETWORK STREAM

The present invention relates to a method for distributing a network stream from at least one data source, in particular a camera, to processors or processor cores of an RSS-capable computing device. Furthermore, the present invention relates to a computer program designed to perform each step of the method, and to a machine-readable storage medium on which the computer program is stored. Lastly, the present invention relates to a camera designed to perform the method.

PRIOR ART

Common operating systems for computing devices usually work in such a way that a single network connection is permanently assigned to a processor or processor core. This processor or processor core will process all incoming data packets that belong to precisely this network connection. A network connection is defined here by its source and its destination. These can each be specified with a MAC address and port number and, if necessary, an IPv4/6 address. This fixed assignment of network connection to processor or processor core has the advantage that processor registers do not have to be constantly reloaded and that interrupts always occur at the same point.

However, when very large amounts of data are transported over a single network connection, as may be the case for example with an industrial camera, the processor or processor core responsible for that network connection may become overloaded and data loss may occur. This becomes a problem in current personal computer architectures, especially with data streams that exceed a gigabit connection. From a transmission speed of about 5 to about 7 gigabits per second from a single source, the reliability of the connection decreases sharply. In the case of industrial cameras, this can lead to individual images arriving incompletely or not at all in the destination system. Such cameras can currently transmit at a speed of 10 or more gigabits per second.

Modern network cards usually have the RSS (Receive Side Scaling) function. This function is described in the document Microsoft: Receive-Side Scaling Enhancements in Windows Server 2008 (http://download.microsoft.com/download/a/d/f/adf1347d-08dc-41a4-9084-623b1194d4b2/rss_server2008.docx). When this function of a network card is activated, two things basically happen: First, the network card or the device driver of the network card generates a so-called RSS indirection table. This is a table in which the number of a processor or processor core is stored for each index. In addition, the network card calculates a hash value for each incoming data packet and an index in this table via this hash value. The processor or processor core that is stored at this point in the table will process this data packet. The area of the data packet over which the hash value is calculated is static for the duration of a connection. This means that all data packets of a connection are always processed on the same processor or processor core. A connection here is the combination of source IP address and destination IP address and port. The hash algorithm generates a pseudo-random distribution to the processor cores from IPv4/6 addresses and ports of source and destination. In this way, with many open network connections, the probability that the work is distributed approximately equally across all processors or processor cores in the system is relatively high.

However, as in the case of industrial cameras, when dealing with one or a few connections that use almost all of the available bandwidth of the network link, an imbalance occurs and one or more processor cores are loaded much more heavily than others, since the hashing algorithm of the network card only looks at the source and destination parameters of a connection, ignoring the amount of data that is transported over that connection.

It is therefore an object of the present invention to provide a method for distributing a network stream from at least one data source, in particular a camera, to processors or processor cores of a computing device, by means of which method an overload of the processors or processor cores can be avoided.

DISCLOSURE OF THE INVENTION

This object is achieved in one aspect of the invention by a method that distributes a network stream from at least one data source, in particular a camera, to processors or processor cores of an RSS-capable computing device. In this context, an RSS-capable computing device is understood to be a computing device having a network card which supports the receive side scaling (RSS) function, wherein, when this function is activated, the network card or its device driver generates an RSS indirection table in which there is stored, for each index, the number of a processor or processor core, which will process an incoming data packet assigned to this index, and subsequently the network card calculates a hash value for each incoming data packet and maps the hash value to an index in precisely this table, wherein the hash value is formed via the combination of source and destination IP addresses and ports and is thus static for the duration of the connection. This method comprises the following steps:
  a) specifying at least one processor or processor core of the computing device,
  b) selecting a port of the at least one data source,
  c) generating a data set assigned to the selected port,
  d) determining the processor or processor core assigned to the data set,
  e) repeating steps b to d until a port has been determined for each given processor or processor core, and
  f) sending data packets via the ports that have been determined for the specified processors or processor cores.

A data set is understood here to mean data that do not contain any information relevant to the primary function of the data source, such as camera image data, but that are only used to create an assignment between a processor or processor core and a port. Therefore, the data set does not have to be sent from the data source to the computing device, but can be generated by the computing device itself to thus simulate a data stream between the data source and the computing device.

The port is in particular a UDP port.

This method enables the data source to send data to the same computing device via a plurality of parallel connections. This makes it possible to use exactly one processor or processor core per parallel connection, to guarantee that no two connections are processed on one processor or processor core and to achieve a deterministic rather than a pseudo-random distribution of work.

By specifying at least one processor or processor core, the method can determine where the network stream in the computing device is to be directed. For this purpose, it is preferred that a list of processors or processor cores is read from the RSS indirection table of the computing device. This list is then provided to a user via a user interface in step a for specifying the at least one processor or processor core.

The port is preferably selected by selecting a port with a predetermined port number in a first execution of step b and by increasing the port number by one with each repetition of step b. This makes it possible to try the ports one after the other until a port has been found for each predetermined processor or processor core.

When generating the data set in step c, a hash value is preferably generated, in particular a 32-bit hash value. Some bits of the hash value are used to select an entry in the RSS indirection table of the computing device. In particular, a Toeplitz hashing method is used here, in which a hash key is multiplied by a Toeplitz matrix. The bits are LSBs (Least Significant Bits) in particular.

The processor or processor core is determined in step d preferably by reading the RSS indirection table of the computing device. This can be used to find out which processor or processor core would receive a data packet sent with the same address information as the data set.

When trying the ports one after the other, it may be that a plurality of ports are determined for one of the selected processors or processor cores before the repetition of steps b to d has been completed by determining a port for each specified processor or processor core. In this case, it is preferred that in step f data packets are sent to only one of these ports, so that the method can be carried out using a minimum number of ports. It is particularly preferred that this is the first port determined for the specified processor or processor core. Further ports determined for this processor or processor core can then be discarded when step d is performed repeatedly.

The method enables the various embodiments to have applications that would not be possible if the work were distributed pseudo-randomly across a plurality of processors or processor cores:

In one embodiment of the method, a plurality of processors or processor cores are specified and network data packets, which are image data packets, are sent to one or more first processors or processor cores. Image data processing, which may be face recognition, for example, is then performed in one or more second processors or processor cores. This allows decoupling of the network data stream and the actual application. The at least one processor or processor core selected for processing the network data packets exclusively processes the network data and is powerful enough to do so, since it does not get any other work.

Image data processing can then be distributed to some or all of the remaining processors or processor cores.

This is particularly useful when combined from within a computing device application program with the setting of a processor affinity that explicitly binds the image analysis to the processors or processor cores selected for this purpose, while receiving the network data happens exclusively on the processor or processor core selected for this purpose.

In another embodiment of the method, a plurality of processors or processor cores are specified and, in each case, after a specified switching interval, a switch is made from sending to one processor or processor core to sending to another processor or processor core. For this purpose, it is preferred that all subsequent data packets are marked with a different sender in the data source after the switching interval so that they can be assigned to the other processor or processor core on the computing device. This makes it possible to distribute the processor load resulting from the data reception to two or more processors or processor cores in a case in which the user cannot or does not want to distribute his work further himself or if a single processor or processor core would be too weak to receive the data.

In yet another embodiment of the method, a plurality of processors or processor cores are specified and, in the case of a plurality of data streams flowing from the data source to the computing device, all data packets of a data stream are sent to one processor or processor core assigned to the data stream in each case. This allows a deterministic distribution of a plurality of network streams to one processor or processor core each. Compared to a pseudo-random distribution, this avoids the risk that a redistribution of the allocation between network connection and processor or processor core occurs with each start of the method and that, in the worst case, all network streams would have to be processed on a single processor or processor core. This embodiment is particularly advantageous when using a plurality of data sources. Here, each data stream of one of these data sources can be exclusively assigned to another processor or processor core, which enables a uniform deterministic utilisation of the processors or processor cores.

In a second aspect of the invention, two computer programs containing a set of instructions are provided which are designed to perform each step of the method when performed on the computing device and the data source. For this purpose, in a third aspect of the invention, they are stored on the machine-readable storage medium. Preferably, a plurality of registers are provided in the firmware of the data source and are filled with data by the computer program for optimal distribution of the data packets to the selected processors and processor cores. The machine-readable storage medium comprises all non-transitory computer-readable media, except a transitory, propagating signal.

In a fourth aspect, the invention relates to a camera which is designed to distribute a network stream to processors or processor cores of the RSS-enabled computing device by means of the method.

BRIEF DESCRIPTION OF THE DRAWINGS

Exemplary embodiments of the invention are shown in the drawings and will be explained in more detail in the following description.

EXEMPLARY EMBODIMENTS OF THE INVENTION

Figure 1:
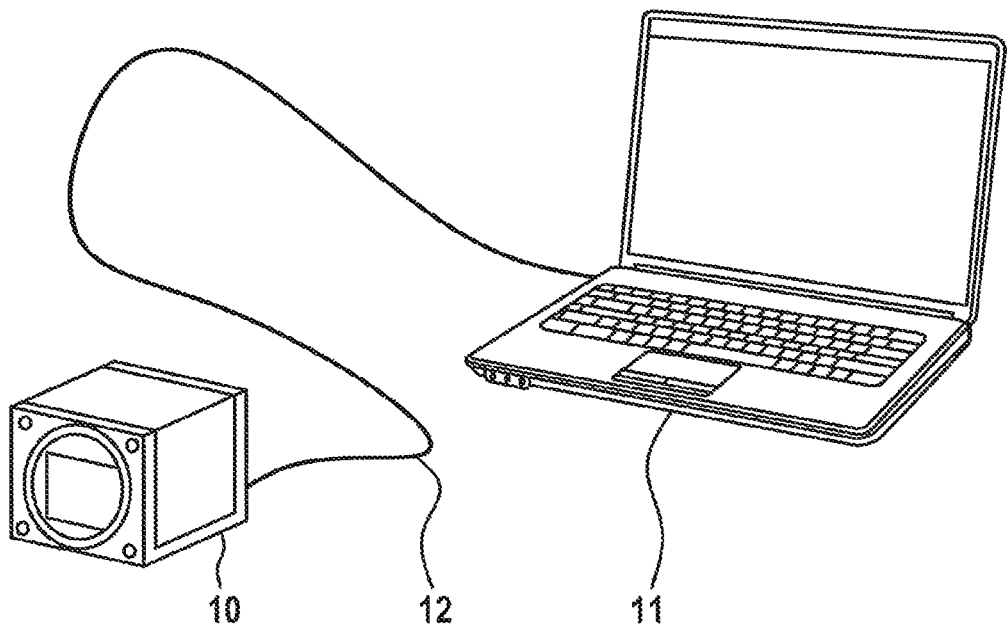
FIG. 1 shows a camera and a computing device that can be used in exemplary embodiments of the method according to the invention.

FIG. 1 shows a data source, which in the present exemplary embodiment is a GigE Vision® industrial camera 10 of the type mvBlue COUGAR-XT with a data transmission rate of 10 gigabits per second. It is controlled by a computing device 11 running the software package mvIMPACT Acquire. The camera 10 is connected to the computing device 11 by means of a data connection 12 in the form of an Ethernet cable.

Figure 2:
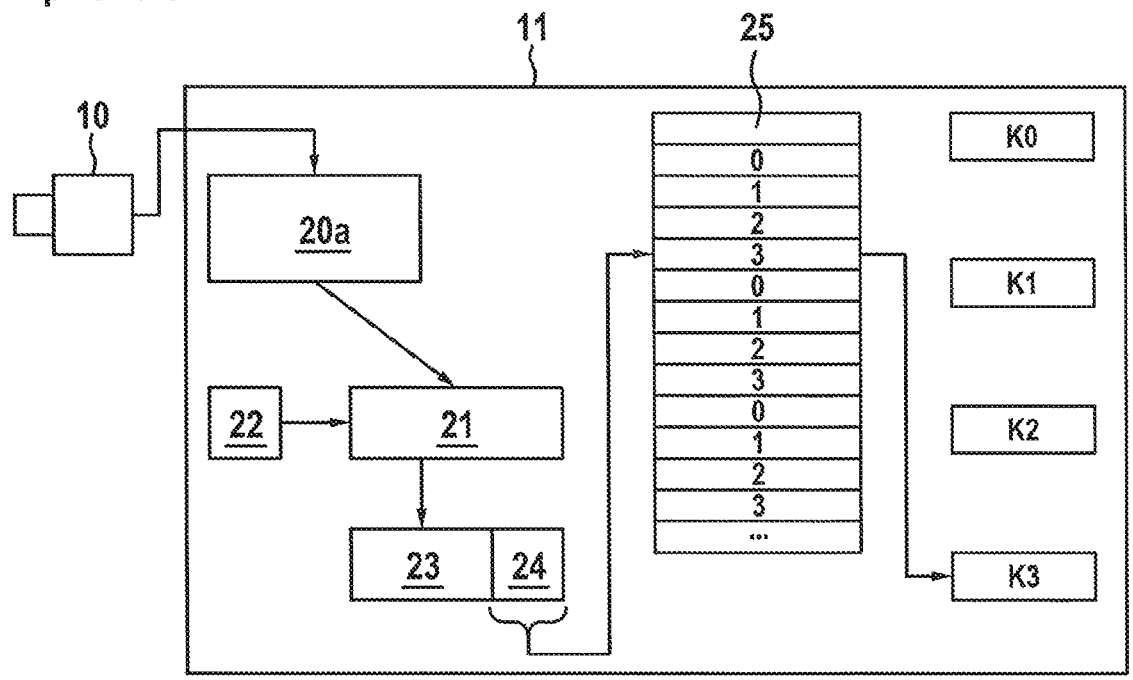
FIG. 2 schematically shows a pseudo-randomly distributed network stream in a prior art method.

In a conventional operating mode using RSS, the camera 10 sends data packets 20*a* to the computing device 11 as shown in FIG. 2. Using their source IP address and source port, these are subjected to a hash function 21, which uses a hash key 22. The hash key 22 is read from a driver of a network card of the computing device 11. This generates a hash value 23 which, in addition to the hash key 22, the source IP address and the source port, also includes the destination IP address and the destination port of the computing device 11. The LSB bits 24 of the hash value 23 are used as an index in an RSS indirection table 25 to allocate the entire data packet 20*a* to a processor core of the computing device 11. In the present exemplary embodiment, the computing device 11 has four processor cores K0-K3. All data packets 20*a* sent from the camera 10 to the computing device 11 are sent from the same source IP address and the same source port to the same destination IP address and the same destination port, and therefore have the same hash value 23. They are therefore all forwarded to the same processor core. In the present example, this is processor core K3.

Figure 3:
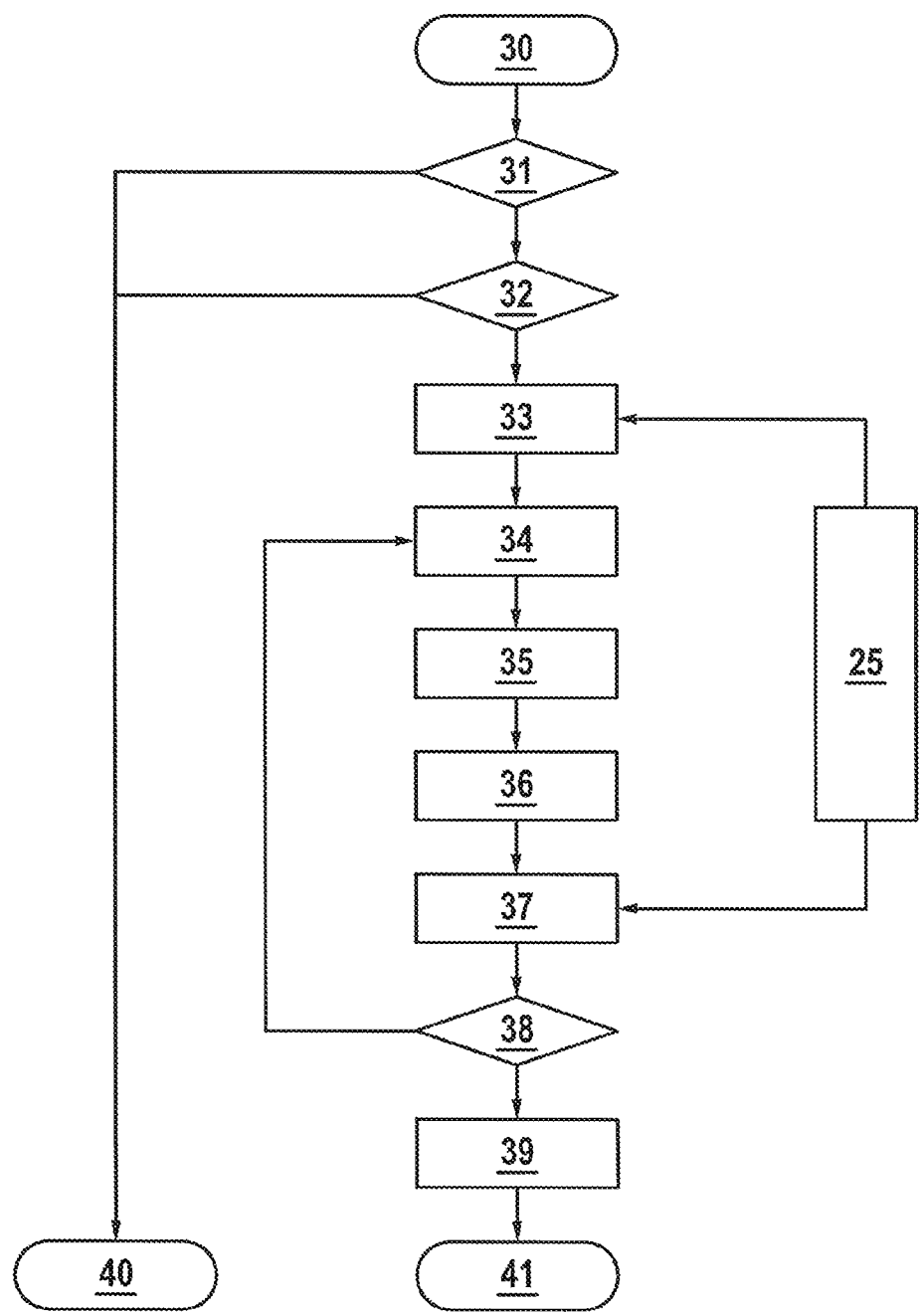
FIG. 3 shows a flow chart of a method according to an exemplary embodiment of the invention.

In an exemplary embodiment of the method according to the invention, the sequence of which is shown in FIG. 3, a deterministic assignment of different data packets to different processor cores K0-K3 is made possible. After the start 30 of the method, a check 31 is first carried out to determine whether the firmware of the camera 10 is set up for the method according to the invention. For this purpose, a question is sent from the computing device 11 to the camera 10. Subsequently, a further check 32 is carried out as to whether the RSS indirection table 25 can be read out from the network card of the computing device 11. This only works if the network card supports RSS and RSS is activated on the network card. If one of the conditions checked in the two tests 31, 32 is not fulfilled, the method is aborted 40 and a message is displayed on a user interface of the computing device 11, indicating that the method according to the invention cannot be performed. The camera 10 is then operated by means of a conventional method. Otherwise, a list of processor cores K0-K3 is read from the RSS indirection table 25 and a user is prompted via the user interface to select 33 at least one of the processor cores K0-K3. In another exemplary embodiment of the invention, this selection is performed automatically by a computer program. After the user has specified 34 at least one processor or processor core K0-K3 by his selection, a first UDP port of the camera 10 is selected 35. In the present exemplary embodiment, this is the UDP port 1000, wherein the source IP address is for example 192.168.0.1. A data set 20 assigned to the selected UDP port is then generated 36 in the computing device 11.

Figure 4:
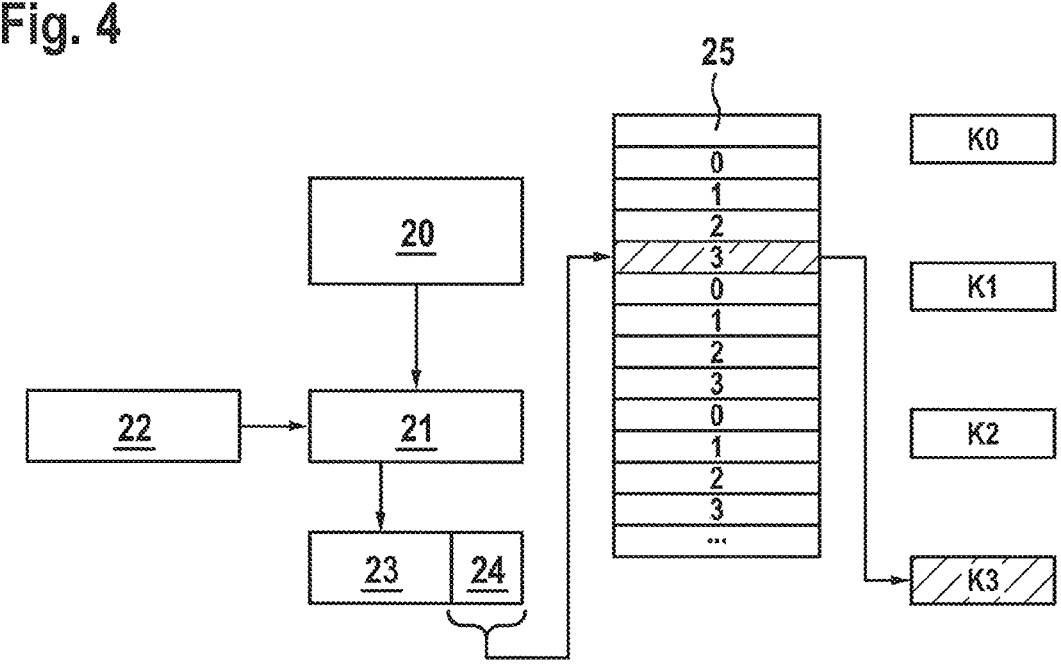
FIG. 4 schematically shows a step of a method according to an exemplary embodiment of the invention.
Figure 5:
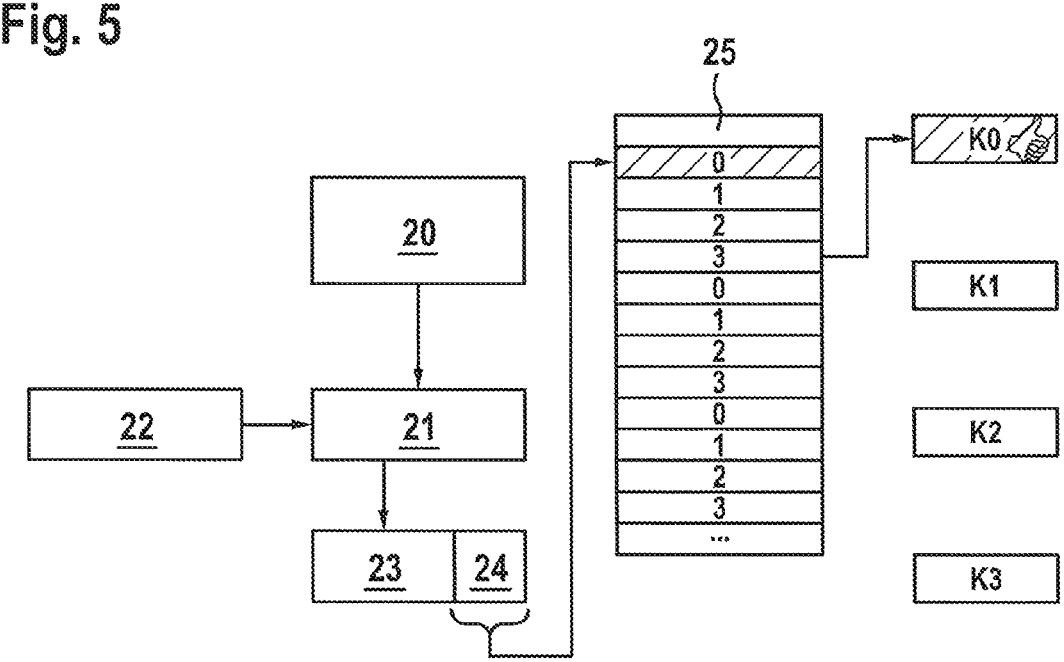
FIG. 5 schematically shows a further step of a method according to an exemplary embodiment of the invention.
Figure 6:
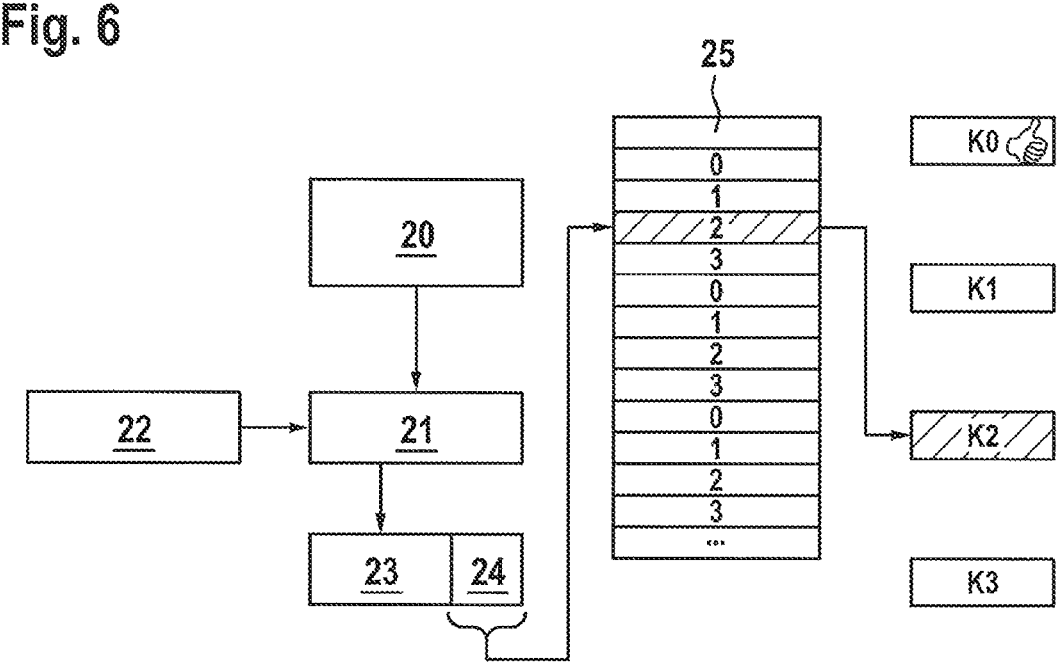
FIG. 6 schematically shows yet a further step of a method according to an exemplary embodiment of the invention.
Figure 7:
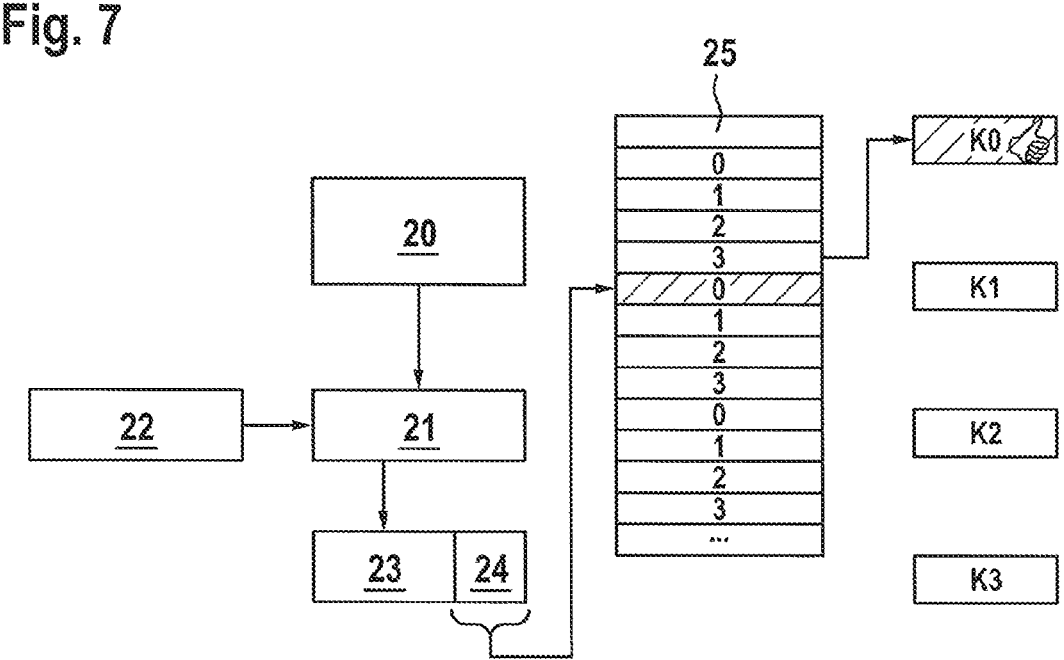
FIG. 7 schematically shows yet a further step of a method according to an exemplary embodiment of the invention.
Figure 8:
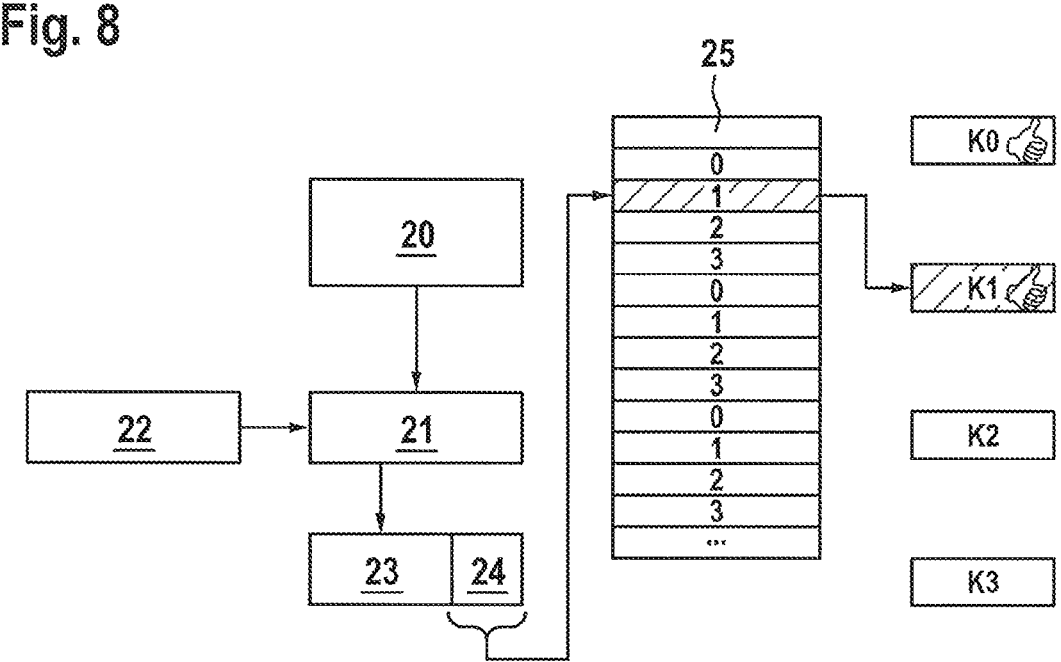
FIG. 8 schematically shows yet a further step of a method according to an exemplary embodiment of the invention.

As shown in FIG. 4, the data set 20 is subjected in the known manner to the hash function 21, which uses the hash key 22 to generate the hash value 23. Its LSB bits 24 are used to select an entry in the RSS indirection table 25. The entry specifies the processor core that would process a data packet with the previously selected source and the previously selected destination. When sending a data packet via the UDP port 1000, the processor core K3 would be addressed. For example, if the user selected processor cores K0 and K1, this will not match a selected processor core. If a check 38 shows that a matching UDP port could not yet be determined for each selected processor core, a next UDP port of the camera 10 is then selected 35. For this purpose, the port number is increased by 1, so that the UDP port 1001 is used in the following. As shown in FIG. 5, this results in a data set 20 being assigned to processor core K0 and thus to one of the two selected processor cores. This means that a UDP port is now known for one but not yet for both of the selected processor cores. The method is therefore continued. The UDP port number is again increased by one to 1002. As shown in FIG. 6, this leads to the addressing of the processor core K2, which, however, has not been selected. The use of the next UDP port 1003, as shown in FIG. 7, leads to the re-addressing of processor core K0. Since a UDP port matching the processor core K0 has already been determined, this further matching UDP port number is discarded. FIG. 8 shows that setting the UDP port number to 1004 again now leads to addressing of the second selected processor core K1. The next check 38 thus shows that a UDP port number could be assigned to each selected processor core, whereupon a sending 39 of data packets via the UDP ports of the specified processor cores K0 and K1 could be started.

Figure 9:
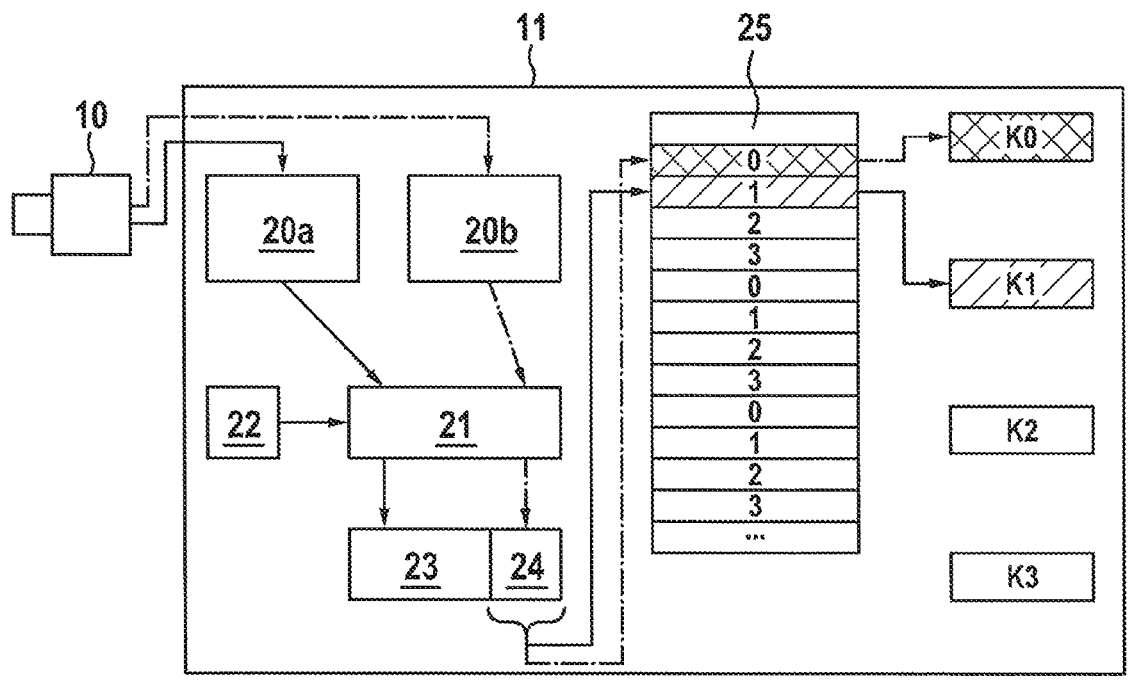
FIG. 9 shows a deterministic distribution of a plurality of network streams in an exemplary embodiment of the method according to the invention.

As shown in FIG. 9, for example data packets 20*a* sent via UDP port 1004 can now be forwarded to processor core K1, and data packets 20*b* sent via UDP port 1001 can be forwarded to processor core K0.

When a termination 41 of the method occurs by switching off the camera 10 and the computing device 11, the associations between processor core and UDP ports are deleted and determined again when the method is restarted 30.

Figure 10:
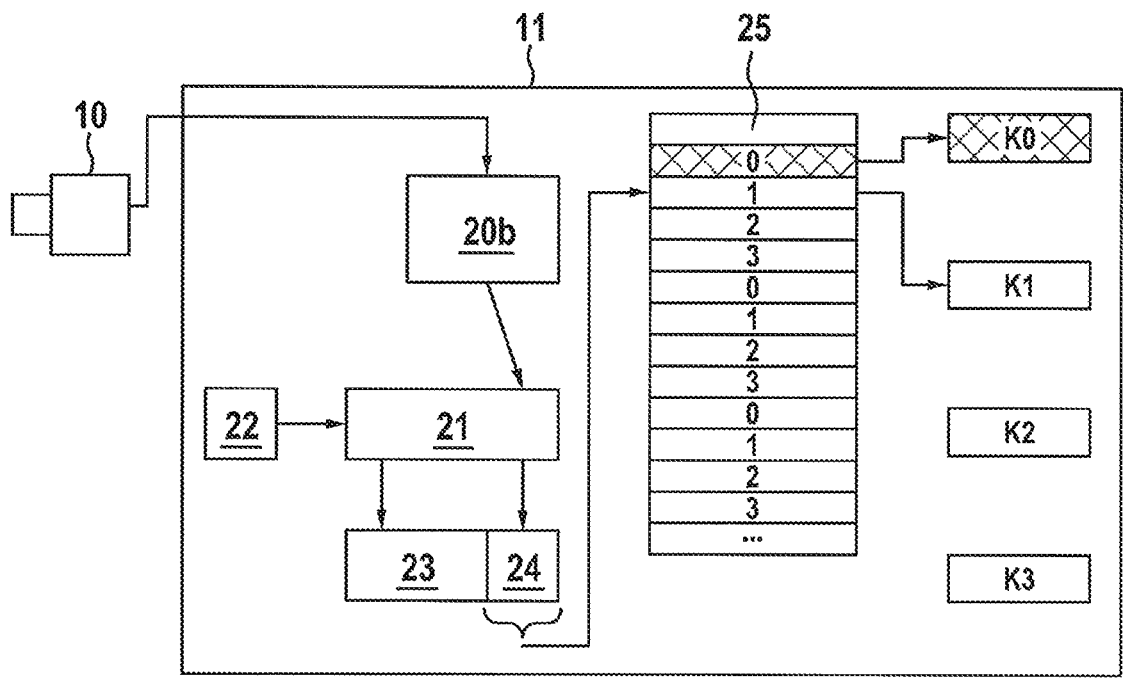
FIG. 10 shows a deterministic distribution of a network stream in an exemplary embodiment of the method according to the invention.
Figure 11:
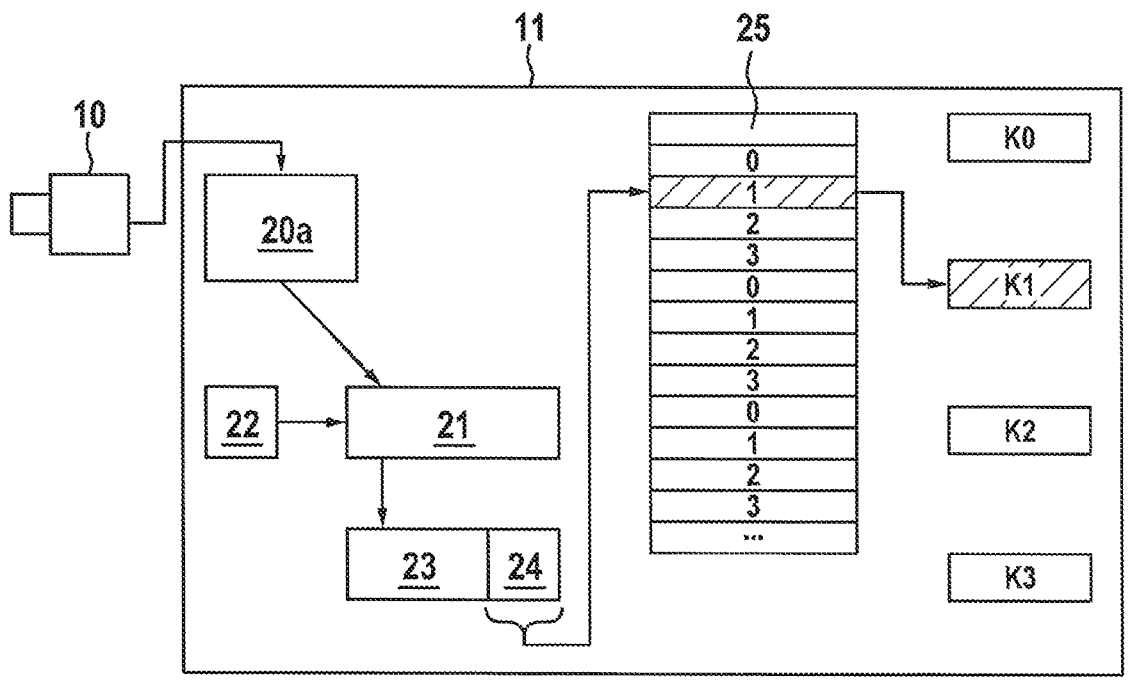
FIG. 11 shows another deterministic distribution of a network stream in an exemplary embodiment of the method according to the invention.

In another exemplary embodiment of the method, it is not intended to distribute different data packets 20*a*, 20*b* simultaneously to the two specified processor cores K0, K1. Instead, only data packets 20*b* that are to be processed by processor core K0 for a specified time interval are sent. For this purpose, they are sent via the UDP port 1001. This is shown in FIG. 10. After the time interval has expired, the further data packets 20*a* are to be processed on the processor core K1. For this purpose, they are sent via the UDP port 1004. This is shown in FIG. 11. After the time interval has elapsed again, it is possible to return to data processing in the processor core K0 by changing the UDP port used from 1004 to 1001 again.

The invention claimed is:

1. Method for distributing a network stream from at least one data source to processors or processor cores of a computing device having a network card which supports the receiver side scaling function, wherein, when this function is activated, the network card or its device driver generates a receiver side scaling indication table in which there is stored, for each index, the number of a processor or processor core, which will process an incoming data packet assigned to this index, and subsequently the network card calculates a hash value for each incoming data packet and maps the hash value to an index in precisely this table, wherein the hash value is formed via the combination of source and destination IP addresses and ports and is thus static for the duration of the connection, the method comprising the following steps: (a) specifying at least one processor or processor core of the computing device, (b) selecting a port of the at least one data source, (c) generating a data set assigned to the selected port that is used to create an assignment between a processor or processor core and a port, wherein the data set is computed by the computing device and simulates a data stream between the at least one data source and the computing device, wherein characterised in that when generating the data set, a hash value is generated and some bits of the hash value are used to select an entry in the receiver side scaling indirection table of the computing device, (d) determining the processor or processor core assigned to the data set, (e) repeating steps (b) to (d) until a port has been determined for each specified processor or processor core, and (f) sending data packets via the ports determined for the specified processors or processor cores.

2. The method according to claim 1, characterised in that the data source is a camera.

3. The method according to claim 1, characterised in that a list of processors or processor cores is read from the receiver side scaling indirection table of the computing device and is provided to a user via a user interface in step (a) for specifying the at least one processor or processor core.

4. The method according to claim 1, characterised in that the port is selected by selecting a port with a specified port number in a first execution of step (b) and by increasing the port number by one with each repetition of step (b).

5. The method according to claim 1, characterised in that the processor or processor core is determined in step (d) by reading the receiver side scaling indirection table of the computing device.

6. The method according to claim 1, characterised in that during the sending in step (f), if a plurality of ports have been determined for a specified processor or processor core, data packets are sent to only one of these ports.

7. The method according to claim 1, characterised in that a plurality of processors or processor cores are specified and image data packets are sent to one or more first processors or processor cores and image processing is performed in one or more second processors or processor cores.

8. The method according to claim 1, characterised in that a plurality of processors or processor cores are specified and, in each case after a predefined switching interval, a change is made from sending to one processor or processor core to sending to another processor or processor core.

9. The method according to claim 1, characterised in that a plurality of processors or processor cores are specified and, in the case of a plurality of data streams flowing from the at least one data source to the computing device, all data packets of a data stream are sent to one processor or processor core assigned to the data stream in each case.

10. The method according to claim 1 including a first non-transitory computer-readable medium containing a first set instructions thereon and a second non-transitory computer readable medium containing a second set of instructions thereon, wherein the first and second set of instructions jointly perform each step.

11. The method according to claim 1 including a camera designed to distribute a network stream to processors or processor cores of a computing device having a network card supporting the receive side scaling function.

* * * * *